Patented Nov. 11, 1924.

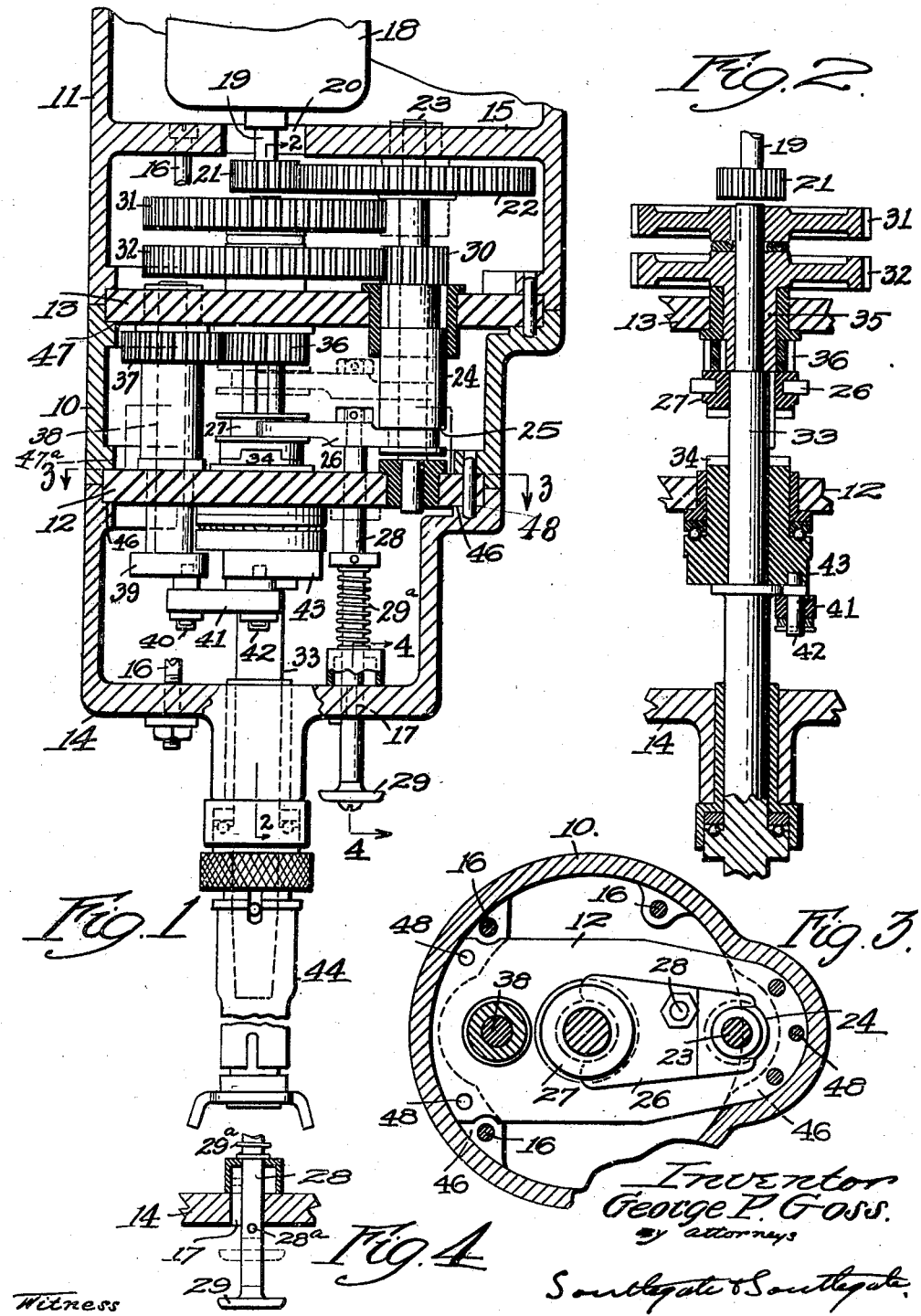

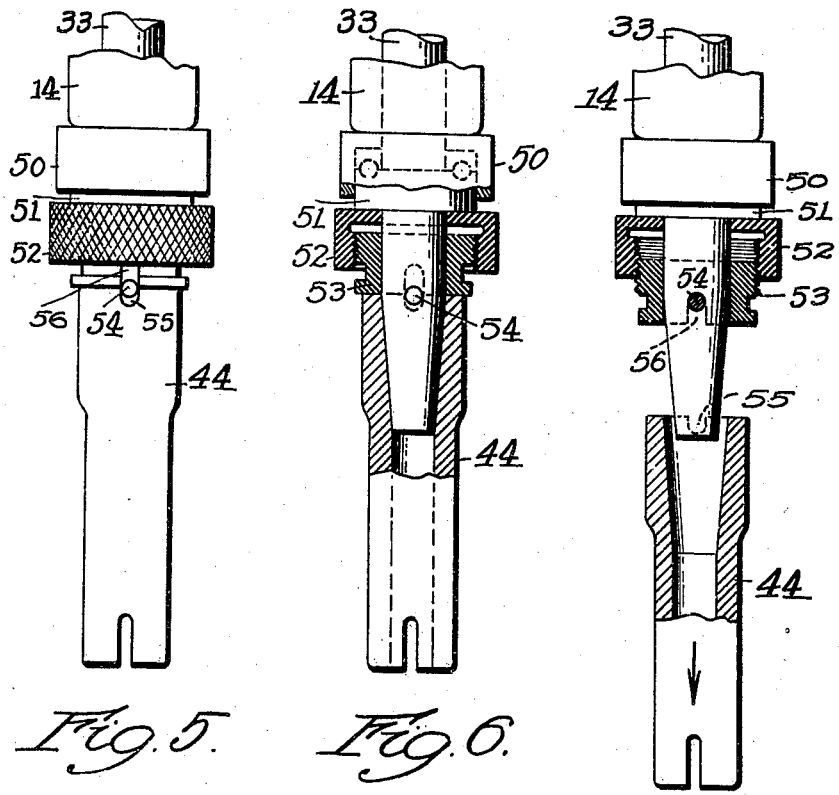

1,515,029

UNITED STATES PATENT OFFICE.

GEORGE P. GOSS, OF WORCESTER, MASSACHUSETTS, ASSIGNOR, BY MESNE ASSIGNMENTS, TO WORCESTER ELECTRIC TOOL COMPANY, A CORPORATION OF MASSACHUSETTS.

VALVE GRINDER.

Application filed May 6, 1920, Serial No. 379,379. Renewed March 25, 1924.

*To all whom it may concern:*

Be it known that I, GEORGE P. GOSS, a citizen of the United States, residing at Worcester, in the county of Worcester and State of Massachusetts, have invented a new and useful Valve Grinder, of which the following is a specification.

This invention relates to the motor driven type of portable valve grinder, and the principal objects thereof are to provide an improved supporting casing and frame-work which can be easily and cheaply assembled; improved geared connections for transmitting the power from the rapidly rotating motor shaft to the comparatively slowly operating tool shaft in a satisfactory and convenient manner; simplified and convenient means for instantaneously converting it from a valve grinder having an oscillating motion of the tool, to a drill or other tool having a continuous rotary motion; and improvements in details of construction and combinations of parts.

Reference is to be had to the accompanying drawings, in which—

Fig. 1 is a longitudinal sectional view of a tool constructed in accordance with this invention, showing a second position of the parts in dotted lines;

Fig. 2 is a sectional view on the line 2—2 of Fig. 1 of the tool shaft and its connected parts;

Fig. 3 is a horizontal sectional view on the line 3—3 of Fig. 1;

Fig. 4 is a sectional view of certain details of the construction on the line 4—4 of Fig. 1; and Figs. 5, 6 and 7 are a side and two sectional views of a tool holder therefor.

The invention is shown in a form comprising a hollow casing or frame 10 adapted to carry and support a motor casing 11 at one end and provided with detachable cross pieces 12 and 13 at its ends for supporting and locating certain elements as will appear and with a bottom 14. The motor casing is shown as having a cross wall 15. This and the bottom 14 constitute top and bottom plates for the support of certain shafts. These parts 10, 14 and 15 are connected together in any desired manner, as by bolts 16.

The motor 18 is provided as usual with a main shaft 19 which extends through a hole 20 in the plate 15 and is provided with a pinion 21 thereon, meshing with a gear 22 on what I will call the driving shaft 23. This shaft is arranged vertically and has bearings in the plates 12, 13 and 15. It is provided with a hollow shaft 24 slidably mounted on it but keyed to rotate with it in all its positions. This shaft 24 is provided with a groove 25 for receiving an operating connection 26, the other end of which operates a collar 27 as will appear later.

A rod 28 having a handle 29 extends down through the plates 12 and 14 from the operating connection 26 for shifting the shaft 24 and collar 27 up and down.

This operating rod 28 is provided with a pin 28ª projecting from it and adapted to pass through a slot 17 in the bottom plate 14. This plate is of sufficient thickness so that when the rod is pulled down so that the pin will pass below it, the rod can then be turned to one side or the other and the pin will hold it in the position shown in full lines in Fig. 1. Then, when it is turned so that the pin can enter the slot again, a spring 29ª will force the parts up to the dotted line position.

The shaft 24 is provided with a pinion 30 either cut on its surface or secured to move with it and to transmit the rotation of the shaft 24 to either of a pair of gears 31 and 32 located on the same axis and in position to receive this pinion in the two extreme positions of the operating member 26. The gear 31 is fixedly mounted on the spindle shaft 33 which is parallel with the driving shaft and is supported by bearings carried by the plates 12, 13 and 14, ball bearings being used preferably as shown for the two lower ones.

The spindle shaft 33 is provided with a clutch 34, one member of which comprises the collar 27 previously mentioned, operated by the operating piece 26. When this clutch is thrown in by motion of the piece 26 to the full line position shown in Fig. 1, the shaft 33 is positively connected with an oscillating disc 43 centrally but freely mounted thereon. The motion of the operating piece 26 to this position also brings the pinion 30 out of engagement with the gear 31 and into engagement with the gear 32.

The gear 32 is mounted on a free bushing 35 centered on the shaft 33 and carried by a bearing in the plate 13. This bushing has fixed to it, a pinion 36 which meshes with a pinion or gear 37 on a third vertical shaft 38, mounted in bearings on the plates 12 and 13 and located between them preferably. This shaft is provided with a disc 39 having an eccentric stud 40 thereon connected by a link 41 with a stud 42 on the previously mentioned eccentric disc 43 on the shaft 33.

The result of making the connection shown in full lines is that instead of transmitting the motion of the motor shaft through the driving shaft to the tool spindle 33 as a slow continuous rotation, it is transmitted to it through the third shaft in the form of an oscillation. It will be seen therefore, that in the former case, the lower end of the tool spindle should be provided with a tool holder carrying a drill or any other tool which is designed to rotate, but in the latter case, a tool holder 44 should be provided for a valve grinding tool or other tool which is adapted to oscillate. When the machine runs in the position shown in dotted lines in Fig. 1, for drilling or the like, the gear 32 and the third shaft with its oscillating connections are left in stationary position although not locked therein, and when the parts are returned to the full line position in Fig. 1 for producing the oscillating motion, the gear 31 is entirely inactive but it oscillates with the spindle shaft to which it is fixed.

A feature of this invention consists in the way in which the parts 12, 13, 14 and 15 are connected with each other whereby the instrument can be set up accurately and assembled quickly and rapidly.

It is to be observed that the plate 12 rests in seats 46 in the top wall of what I have called the bottom 14. These seats are milled out to fit the bottom of the plate 12 and are located at opposite sides of this bottom 14. The plate 12 is narrower than the plate B. The casing 10 is smaller than the element 11 and the substantially cylindrical element 14, but they rest against it at their ends. The inside of the main casing 10 is substantially the same size as these seats 46 after they are cut out and this casing is provided with lugs 47ª resting on the plate to hold it. Dowels 48 are used to hold the parts in position. The casing 10 has seats 47 of a similar nature for receiving the plate 13 and the top casing 11 has lugs like the lugs 47ª and dowels also. The bolts 16 pass through the lugs on the casing 10 but not through the plates 12 and 13.

The operating shafts with their gearing are assembled on the three elements 10, 12 and 13 before the parts 14 and 11 are applied. That is the reason why the casing 10 is referred to as a main casing. This permits of assemblage of the parts in a convenient manner where they can be inspected and operated experimentally before the entire instrument is put together.

Thus, this constitutes a substantial and practical support for the mechanism described, preventing the parts from getting out of alignment or unduly wearing or straining in the operation of the machine, and also the parts can be dismounted and re-assembled readily if desired. One of the important features is the ease and quickness with which the machine can be converted from the rotary to oscillating motion and the comparative simplicity of the mechanism by which the two motions are secured.

For the purpose of providing for the ready removal of the tool holder 44 from the spindle shaft 33, I have shown the following mechanism, reference being had especially to Figs. 5, 6 and 7.

The spindle shaft 33 has a bearing in a boss projecting centrally from the bottom plate 14 which constitutes the end of the casing. Below this is a ball bearing casing 50, the rotatable member 51 of which is provided with an enlarged knurled head 52. This is internally screw threaded and a member 53 having an internal screw thread is mounted in it. The shaft 33 passes through these several elements centrally and its conical end fits in the tool holder 44 with a driving fit, so that it can be detached ordinarily by tapping it with a hammer. It is to avoid this operation and the consequent injury to the parts that this part of the device is provided.

Through the shaft 33 passes a pin 54 and when the parts are in their assembled condition as shown in Figs. 5 and 6, the ends of this pin extend into two slots 55 and 56, one of them located in the tool holder 44 and the other in the member 53. It will be seen that the shaft 33 positively rotates the member 53 and consequently the head 52 which presents no resistance to its rotation, and also positively rotates the tool holder 44.

When it is desired to remove the tool holder the head 52 is turned with one hand, the tool holder 44 being held against rotation by the other or in any desired way. This results in unscrewing the member 53 and forcing the tool holder off the taper. Thus in a very simple way the tool holder is loosened and the usual hammering of this part of the machine is dispensed with.

Although I have illustrated and described only a single form of the invention, I am aware of the fact that modifications can be made therein by any person skilled in the art without departing from the scope of the invention as expressed in the claims. Therefore, I do not wish to be limited to all the details of construction or the exact combinations of parts herein shown and described, but what I claim is:—

1. In a valve grinder, the combination with means for supporting a motor and its casing, a driving shaft, a gear on the driving shaft for receiving power from the motor shaft, a spindle shaft, a gear fixed on the spindle shaft, a gear rotatably mounted on the spindle shaft, a third shaft connected with the last named gear, means for transmitting motion therefrom to the spindle shaft as an oscillating motion, a slidable member, a pinion thereon adapted to mesh with either of said gears on the spindle shaft and having means whereby when the pinion is brought into mesh with the gear connected with the oscillating mechanism, the spindle shaft will be clutched to the oscillating mechanism so that that motion will be transmitted to the spindle shaft.

2. In a valve grinder, the combination with a frame having means for supporting a motor and its casing, of a driving shaft longitudinally carried by said frame, a gear on the driving shaft for receiving power from the motor shaft directly, a spindle shaft parallel with the driving shaft, a gear fixed on the spindle shaft, a gear rotatably mounted on the spindle shaft, a third shaft connected with the last named gear and having means for transmitting motion therefrom to the spindle shaft as an oscillating motion, a slidable member, a pinion thereon adapted to mesh with either of said gears on the spindle shaft, and means whereby when the pinion is brought into mesh with the gear connected with the oscillating mechanism, the spindle shaft will be at the same time clutched to the oscillating mechanism so that that motion will be transmitted to the spindle shaft.

3. In a valve grinder, the combination with a frame for supporting a motor and its casing, of a driving shaft longitudinally carried by said frame, means on the driving shaft for receiving power from the motor shaft, a spindle shaft, a gear on the spindle shaft, a gear rotatably mounted on the spindle shaft, a third shaft connected with the last named gear, a disc oscillatably mounted on the spindle shaft and having a ball bearing connection with said bearing and connected with the third shaft to be oscillated thereby and having a clutch section for connecting it positively with the spindle shaft for transmitting the rotary motion of the third shaft to the spindle shaft as an oscillating motion, a slidable member, a pinion thereon adapted to mesh with either of said gears on the spindle shaft, and means whereby when the pinion is brought into mesh with the gear connected with the oscillating means, the spindle shaft will be at the same time clutched to the oscillating means.

4. In a valve grinder, the combination of a frame having means for supporting a motor and its casing, with a driving shaft longitudinally carried by said frame, a gear on the driving shaft for receiving power from the motor shaft, a spindle shaft parallel with the driving shaft, a gear on the spindle shaft, a gear rotatably mounted on the spindle shaft, a third shaft connected with the last named gear and having means for transmitting motion therefrom to the spindle shaft as an oscillating motion, a slidable member having a pinion thereon adapted to mesh with either of said gears on the spindle shaft, a hollow shaft keyed to the driving shaft but slidable longitudinally thereon and supporting said pinion, a clutch section slidably mounted on the spindle shaft but keyed thereto for connection with the clutch section and the hollow shaft and capable of moving both of them longitudinally to change the connections.

5. In a valve grinder, the combination of a frame having means for supporting a motor and its casing, with a driving shaft longitudinally carried by said frame, a gear on the driving shaft for receiving power from the motor shaft, a spindle shaft parallel with the driving shaft, a gear fixed on the spindle shaft, a gear rotatably mounted on the spindle shaft, a third shaft, means for transmitting motion from the last named gear to the spindle shaft as an oscillating motion, a hollow shaft keyed to the driving shaft but slidable longitudinally thereon, a pinion carried thereby and adapted to mesh with either of the gears on the spindle shaft, a clutch section slidably mounted with respect to the spindle shaft but keyed thereto for connection with the oscillating mechanism, a plate permanently connected with the clutch section and the hollow shaft and capable of moving them to change the connections, and means for operating the plate comprising a slidable rod having a projection for holding the rod in one of its extreme positions when the rod is turned and a spring for forcing it to the other extreme position when it is free to move.

6. In a valve grinder, the combination of two parallel plates, a surrounding casing to which the plates are detachably secured at its opposite ends, a driving shaft, a spindle shaft and a third shaft, each having bearings in said plates removable therewith, and supported thereby, means connected with the third shaft for creating an oscillating motion, means for driving the spindle shaft from the driving shaft through the third shaft to give the spindle shaft an oscillating motion, and means for driving the spindle shaft directly from the driving shaft with a slow rotating motion.

7. In a valve grinder, the combination of a casing or frame comprising two parallel plates, a surrounding casing to which the plates are detachably secured at its opposite ends, a driving shaft having bearings in said plates and supported thereby, a spindle shaft having bearings in said plates and supported thereby, a third shaft having bearings in said plates, means for driving the spindle shaft from the driving shaft through the third shaft to give the spindle shaft an oscillating motion, means for driving the spindle shaft directly from the driving shaft with a slow rotating motion, and a bottom plate mounted on one end of said frame or casing and having a bearing for the spindle shaft.

8. In a valve grinder, the combination of two parallel plates, a surrounding casing to which the plates are detachably secured at its opposite ends, a driving shaft, a spindle shaft, and a third shaft having bearings in said plates and supported thereby, means for driving the spindle shaft with the driving shaft through the third shaft to give an oscillatory spindle shaft the motion, means for driving the spindle shaft directly from the driving shaft with a slow rotating motion, and a motor casing applied to one end of said casing and centered thereon by the upper one of said two plates and adapted to support a motor for operating the driving shaft.

9. In a valve grinder, the combination of a casing or frame comprising two parallel plates and a surrounding casing to which the plates are detachably secured at its opposite ends, a driving shaft having bearings in said plates and supported thereby, a spindle shaft having bearings in said plates and supported thereby, a third shaft located mainly between said plates, means for driving the spindle shaft from the driving shaft through the third shaft, means for driving the spindle shaft directly from the driving shaft with a slow rotating motion, top and bottom members in the form of casings secured to the opposite ends of said casing and having cross partitions constituting top and bottom walls for the device, and bolts extending through the top and bottom walls and through said plates for holding the parts together.

10. In a valve grinder, the combination of a driving shaft, a spindle shaft, and a third shaft, with a casing having bearings for said shafts, said casing comprising a bottom member having a central bearing for the spindle shaft, means connected with the third shaft for transmitting a motion of rotation therefrom to the spindle shaft as an oscillatory motion, means for driving either of the other two shafts from the driving shaft, a ball-bearing cage on the spindle shaft having an internally screw-threaded head connected with its rotatable part, a member on the end of the spindle shaft, means for positively transmitting a motion of rotation from the spindle shaft to said member, and means screwing into said head and rotatable with the spindle shaft and movable therealong for forcing said member off the end of the spindle shaft when the head and member are rotated in opposite directions.

In testimony whereof I have hereunto affixed my signature.

GEORGE P. GOSS.